Figure 1:
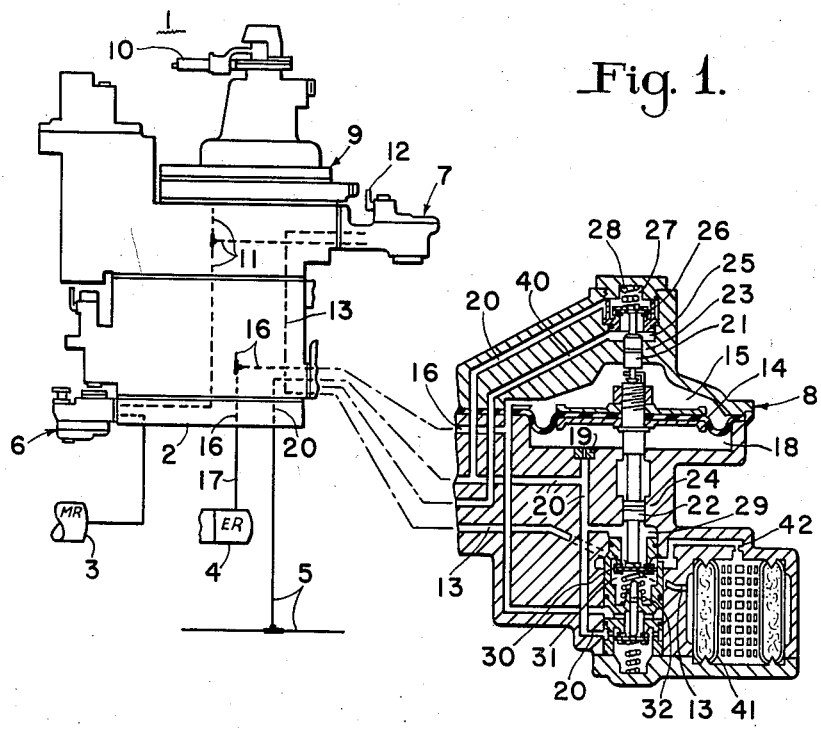

Aug. 5, 1958     A. T. GORMAN ET AL     2,846,271
FLUID PRESSURE BRAKE APPARATUS WITH EQUALIZING
RESERVOIR PRESSURE BUILD-BACK PREVENTING MEANS
Filed Jan. 12, 1956

INVENTORS.
Andrew T. Gorman
Robert J. Worbois
BY
ATTORNEY

United States Patent Office 2,846,271
Patented Aug. 5, 1958

2,846,271

FLUID PRESSURE BRAKE APPARATUS WITH EQUALIZING RESERVOIR PRESSURE BUILD-BACK PREVENTING MEANS

Andrew T. Gorman, Monroeville, and Robert J. Worbois, Irwin, Pa., assignors to Westinghouse Air Brake Company, Wilmerding, Pa., a corporation of Pennsylvania Application January 12, 1956, Serial No. 558,744

7 Claims. (Cl. 303—55)

This invention relates to locomotive fluid pressure brake apparatus, and more particularly to apparatus of the above type which is modified to embody novel means for preventing an undesirable partial build-back of fluid pressure in an equalizing reservoir following an operator-effected reduction in such pressure for initiating a service brake application.

In locomotive brake apparatus of the above type comprising an engineer's automatic brake valve device, an equalizing reservoir, and an equalizing valve device, an essentially adiabatic expansion of the air in the equalizing reservoir will occur, and thereby cause a drop in the temperature of the air in said reservoir, whenever the handle of the brake valve device is moved to a service position to effect a restricted service rate of reduction in equalizing reservoir pressure of a chosen degree; and after the brake valve handle is moved to a lap position for bottling up air in the equalizing reservoir at the desired reduced pressure, the heat absorbed from the ambient air through the wall of the equalizing reservoir will effect a partial restoration or increase in equalizing reservoir pressure.

For example, by actual tests, it has been found that when a full service reduction in equalizing reservoir pressure from 70 p. s. i. to 50 p. s. i. is effected, equilizing reservoir pressure will increase 4 p. s. i. to 54 p. s. i.; and that equalizing reservoir pressure will build-back or increase about 1 p. s. i. for each 5 p. s. i. that equalizing reservoir pressure is initially reduced. This expansion of the air in the equalizing reservoir is described as "essentially adiabatic" because the heat interchange from the ambient air to the metal wall of the equalizing reservoir and from this wall to the air in said reservoir may be considered as negligible during the relatively short period of time the brake valve handle is in service position.

This partial restoration in equalizing reservoir pressure is especially detrimental in locomotive brake apparatus embodying the desirable brake pipe maintaining feature because the equilizing valve device (which always operates to reduce brake pipe pressure a degree corresponding substantially to the chosen reduction in equalizing reservoir pressure) will then additionally operate to maintain brake pipe pressure substantially at the value of equalizing reservoir pressure so that brake pipe pressure will desirably be replenished against allowable leakage. Hence, if there is any such build-back in equalizing reservoir pressure following closure of the usual brake pipe discharge valve in the manner hereinafter to be described, the equalizing valve device will operate to cause an increase in brake pipe pressure corresponding substantially to the extent of such build-back; and since the brake controlling valves in current use in the United States are of the direct release type, subject to opposing fluid pressures in the brake pipe and auxiliary reservoir, an increase in brake pipe pressure of about 1 to 1½ p. s. i. above the then lapped auxiliary reservoir pressure will be sufficient to cause the brake controlling valves on the locomotive and all cars to shift to release position and effect a direct and complete release of brakes throughout the train.

In order to prevent this undesirable release of brakes, it is now necessary for the engineer to watch his equalizing reservoir pressure gauge very carefully after moving the brake valve handle to lap position; and as equalizing reservoir pressure builds back, he must quickly and momentarily shift said handle to service position and then back to lap position in several successive operations until this excess pressure has been bled off and the gauge stabilizes at the proper pressure, for example, 50 p. s. i. in the case of a full service reduction.

The principal object of this invention is therefore to provide an improved locomotive brake apparatus of the above general type embodying means for preventing the above-described undesirable drop in temperature in the equalizing reservoir during a service reduction in equalizing reservoir pressure.

Another object is to provide an improved locomotive brake apparatus embodying means operative while the brake valve handle is in service position to heat the air in the equalizing reservoir to a degree sufficient to maintain such air at substantially the temperature of the ambient air surrounding the reservoir.

Another object is to provide an improved apparatus in which the means described in the foregoing objects is adapted to automatically compensate for variations in the value of ambient temperature.

Another object is to provide an apparatus of the above general type embodying means for offsetting the drop in temperature in the equalizing reservoir which normally occurs due to the essentially adiabatic expansion of air in the equalizing reservoir during a service reduction in equalizing reservoir pressure; and, by thus offsetting and eliminating this temperature drop, eliminate the undesired build-back of equalizing reservoir pressure after this reduction has ceased, so as to obviate the necessity for the above-described manipulation of the brake valve handle to bleed off excess equalizing reservoir pressure.

Figure 2:
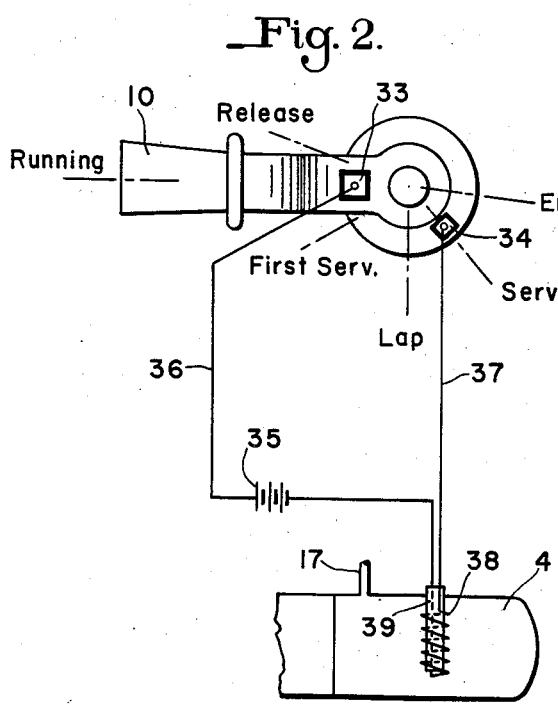

Other objects and advantages will become apparent from the following more detailed description of the invention and from the accompanying drawing, wherein Fig. 1 is a diagrammatic view of a brake apparatus with which the invention may be associated; and Fig. 2 is an enlarged diagrammatic view of a portion of the apparatus of Fig. 1, showing the invention associated therewith.

Description

The invention may, for sake of illustration, be applied to a locomotive brake apparatus of the type shown in Fig. 1, which apparatus is fully shown and described in the copending application of Harry C. May, U. S. Serial No. 509,198, filed May 18, 1955, and assigned to the assignee of the present invention.

This brake apparatus comprises an engineer's automatic brake valve device 1, to a pipe bracket 2 of which are connected a main reservoir 3, an equalizing reservoir 4, and a brake pipe 5 that extends from the locomotive and from car to car through the train. The brake valve device 1 also comprises a feed valve device 6, a brake pipe flat maintaining cut-out valve device 7, and an equalizing valve device 8. This brake valve device 1 also comprises rotary valve means 9 (not shown in detail) operable by arcuate movement of a handle 10 to a plurality of positions designated by suitable legends in Fig. 2 for establishing various porting connections, only those of which are important to the present invention will hereinafter be described; the reader being referred to the aforementioned copending application for a complete description of the operation of said brake valve device, if such is desired.

The feed valve device 6, which may be of the well-known D-24-A type, is supplied with fluid under pressure from the main reservoir 3 and comprises regulating valve means (no shown) operative to provide in a passage 11 fluid at a desired lesser pressure corresponding to a normal full-charge value of brake pipe pressure.

The brake pipe flat maintaining cut-out valve device 7 comprises valve means (not shown) operable responsively to movement of a handle 12 to a normal or maintaining position to connect a branch of passage 11 to a passage 13 for cutting in the flat brake pipe maintaining feature, and operable responsively to movement of said handle to a cut-out position to disestablish such connection for cutting out the flat brake pipe maintaining feature.

The equalizing valve device 8 comprises, briefly, a movable abutment 14 subject at one side to pressure of fluid in a chamber 15 constantly open to the equalizing reservoir 4 via a passage 16 and a pipe 17, and subject at the opposite side to pressure of fluid in a chamber 18 that is constantly open to the brake pipe 5 via a baffle choke 19 and a passage 20. Coaxially attached to opposite sides of the movable abutment 14 are cylindrical stems 21, 22, having sealing, slidably guided contact with the respective walls of aligned bores through casing partitions 23, 24, respectively. Casing partition 23 separates chamber 15 from a chamber 25 at one side of a preferably disc-shaped brake pipe discharge valve 26 which is arranged in a chamber 27 and is urged by a helical spring 28 in the latter chamber to a seated position for normally preventing fluid pressure communication between the chambers 25 and 27. Casing partition 24 separates chamber 18 from a chamber 29 at one side of a preferably disc-shaped maintaining check valve 30 which is contained in a chamber 31 and is normally urged to a seated position by a helical spring 32 in the latter chamber for normally preventing fluid pressure communication between the chambers 29 and 31.

When equalizing reservoir pressure as noted in chamber 15 is equal to brake pipe pressure as noted in chamber 18, the movable abutment 14 will assume a normal or lap position, in which it is shown, and in which the respective stems 21 and 22 are so disposed that the corresponding valves 26 and 30 will be held seated by the respective springs 28 and 32.

According to the invention and as shown in Fig. 2 of the drawing, a suitably insulated contact 33 is carried by the handle 10 of brake valve device 1 and is adapted, only upon movement of said handle to service position, to make contact with a suitably insulated terminal 34 which is preferably provided on the housing of the rotary valve 9. When such contact is made, an electrical circuit will be completed for permitting current to flow from a source of electrical energy, such as a battery 35, via a wire 36 and the contact 33 and terminal 34 to a wire 37 and thence to a heating coil 38 and back to said battery. The heating coil 38 is preferably wound about a porcelain core 39 having sealing, screw-threaded connection with the casing of the equalizing reservoir 4, for providing support for said coil. The heating coil 38 is disposed in the reservoir casing and is of very fine wire so that it will be immediately responsive to movement of the brake valve handle 10 to service position to commence heating of the air in the reservoir and will discontinue further heating of such air promptly when said handle is moved out of service position.

With this arrangement, the air in the equalizing reservoir 4 will be heated, while the brake valve handle is in service position, to a degree sufficient for off-setting the temperature drop which, as explained in the objects of the invention, heretofore occurred in said reservoir. It has been found by actual tests that the power requirements for the heating coil 38 are only about 1 to 1½ kilowatts; and very satisfactory results have been obtained when the invention was applied to a brake apparatus of the type described in the aforementioned copending application and briefly described herein.

It is to be noted that the improved apparatus will operate in exactly the same manner as described in the aforementioned copending application when the brake valve handle 10 is in release, running, first service, lap or emergency position, because the heating coil will then be ineffective. Consequently, only operation of the improved apparatus during a service application of brakes will now be described.

In operation, assume that the brake valve handle 10 is in running position, in which the heating coil 38 is de-energized; and that the brake pipe 5 and equalizing reservoir 4 are charged to the normal operating value of brake pipe pressure via porting connections then effected by the rotary valve 9, in the usual manner. With equalizing reservoir pressure thus equal to brake pipe pressure, the movable abutment 14 of equalizing valve device 8 will be in its previously-defined normal or lap position, in which both the brake pipe discharge valve 26 and the maintaining valve 30 are seated. Assume further that the brake pipe flat maintaining cut-out valve handle 12 is in its maintaining position for admitting air from the feed valve device 6 to the passage 13.

When the brake valve handle 10 is thereafter moved to service position for causing a service application of brakes, fluid under pressure will be released from the equalizing reservoir 4 via pipe 17 and a branch of passage 16 then opened to atmosphere by way of the rotary valve 9 and a restricted passageway (not shown) for effecting a service rate of reduction in equalizing reservoir pressure. This reduction in equalizing reservoir pressure will be noted in chamber 15 of equalizing valve device 8, with the result that preponderant brake pipe pressure in chamber 18 of said device will shift the movable abutment 14 for causing the stem 21 to unseat the brake pipe discharge valve 26; whereupon fluid under pressure will be released from the brake pipe 5 by flow via a branch of passage 20, chamber 27, past the unseated valve 26, to chamber 25 and thence via a passage 40, the usual service choke (not shown) and rotary valve 9 to atmosphere, for causing a service rate of reduction in brake pipe pressure.

When equalizing reservoir pressure has been reduced a degree corresponding to the degree of service application desired, the brake valve handle 10 is moved to lap position for bottling up fluid in the equalizing reservoir 4 at the desired reduced pressure. When brake pipe pressure has reduced, by flow past the brake pipe discharge valve 26, to a degree corresponding substantially to the chosen reduction in equalizing reservoir pressure, the movable abutment 14 will be returned to its lap position by equalizing reservoir pressure and spring 28, and the brake pipe discharge valve 26 will be reseated for terminating the release of brake pipe pressure.

Meanwhile, during the interval of time that brake valve handle 10 was in service position, the heating coil 38 will have been enrgized for heating the air in the equalizing reservoir 4. Since the heating coil 38 will be at ambient air temperature when such heating commences and since the power input to the coil will always be the same when the above-described electrical connection is closed, the temperature of the coil will be increased a preselected constant value above ambient air temperature; and this arrangement will therefore automatically compensate for variations in ambient air temperature. The degree of heating of the air in the equalizing reservoir will, of course, be determined by the length of time the brake valve handle is in service position, and this in turn will determine the degree of drop in equalizing reservoir pressure and hence the degree of drop in equalizing reservoir temperature below ambient temperature resultant from this pressure drop. Hence, irrespective of the value of ambient temperature and irrespective of the length of time the brake valve handle 10 is in service position, the coil will always operate to heat the equalizing reservoir air to a degree sufficient to offset the equalizing reservoir temperature drop attributable to the reduction in equalizing reservoir pressure.

By thus maintaining equalizing reservoir air heated to the ambient air temperature, there will be no absorption of heat from the ambient air, and hence no build-back in equalizing reservoir pressure, after the brake valve handle 10 is moved to lap position; and the improved apparatus therefore obviates the necessity for manipulating the brake valve handle successively from lap to service position, as heretofore required to bleed off excess equalizing reservoir pressure caused by such build-back.

If, while the brake valve handle 10 is in lap position, brake pipe pressure should be reduced, as for example due to brake pipe leakage, preponderant equalizing reservoir pressure in chamber 15 will shift the movable abutment 14 of equalizing valve device 8 for causing the stem 22 to unseat the maintaining valve 30. With valve 30 unseated, fluid under pressure will flow from passage 13 through a curled hair strainer 41 and at the rate controlled by a choke 42 to chamber 31 and thence past the unseated valve 30 to chamber 29, whence it will flow to the brake pipe 5 via a branch of passage 20 for restoring brake pipe pressure to a value substantially equal to equalizing reservoir pressure; whereupon the movable abutment 14 will be returned by brake pipe pressure and spring 32 to its lap position, in which maintaining valve 30 will be reseated by spring 32 for terminating such flow to the brake pipe. The choke 42 limits the rate of flow of brake pipe maintaining fluid to the brake pipe to the maximum permissible rate, such as about 6 p. s. i. per minute preselected by the A. A. R.

It has been assumed in preceding operational description that the service application was effected by moving the brake valve handle 10 directly from running position to service position, which is the practice on many railroads that use first service position of the brake valve handle only to slow down the train. On railroads where it is the practice to effect a service application by successively moving the brake valve handle from running position to first service position and then to service position, the degree of heating of the equalizing reservoir fluid will not be directly proportional to the degree of overall reduction in equalizing reservoir pressure because of the initial reduction in such pressure of about 6 p. s. i. effected in first service position.

It will be noted that, with apparatus heretofore proposed and embodying the brake pipe maintaining feature, a build-back in equalizing reservoir pressure (if not corrected by previously described manipulation of the brake valve handle to bleed off such excess equalizing reservoir pressure) would cause unseating of the maintaining valve of the equalizing valve device because the movable abutment thereof would operate in the same manner as just described to restore brake pipe pressure to substantial equality with increased equalizing reservoir pressure. If this should occur, the brake controlling valves (not shown) on the locomotive and cars would respond to an increase in brake pipe pressure of 1 to 1½ p. s. i. above the then lapped auxiliary reservoir pressure to effect a direct and complete release of brakes from the rear toward the front of the train, with the engineer not being aware of such release until the rearward cars ram into the locomotive.

This dangerous condition is eliminated in the improved brake apparatus.

It is to be noted that the improved arrangement, including the heating coil 38, produces desirable results even though the handle 12 of the brake pipe flat maintaining cut-out valve device 7 may be in cut-out position, in which the passage 13 is cut off from the feed valve device 6, as will now be shown.

Assume that on a long freight train having relatively small or no brake pipe leakage, the brake valve handle 10 is moved from running position to service position for effecting a full service (20 p. s. i.) reduction in equalizing reservoir pressure; and that said handle is then moved to lap position to terminate such reduction. Meanwhile, the brake pipe discharge valve 26 will be unseated for effecting a corresponding reduction in brake pipe pressure; but due to the large brake pipe volume in the long train, the discharge valve 26 will remain open for a considerable period of time after reduction in equalizing reservoir pressure has ceased. During this period a build-back of equalizing reservoir pressure will occur, in the absence of the novel heating arrangement disclosed herein, with the result that the movable abutment 14 will operate to close the discharge valve 26 when brake pipe pressure has been reduced a degree, such as about 18 p. s. i. (instead of 20 p. s. i.), corresponding to existing excess equalizing reservoir pressure due to such build-back, which in turn will provide a brake application of a lesser degree than that desired.

On the other hand, assume that a service reduction, of say 10 p. s. i., is effected in equalizing reservoir pressure on a relatively short train and that the brake pipe discharge valve 26 therefore is closed very promptly after the brake valve handle 10 is moved to lap position. Any build-back in equalizing reservoir pressure will cause unseating of the maintaining valve 30; but if the handle 12 of maintaining cut-out valve device 7 is in cut-out position, brake pipe pressure will not be increased. Thus, if the normal charge value of brake pipe pressure and equalizing reservoir pressure is assumed to be 70 p. s. i., equalizing reservoir pressure may have built back to within 9 or 8 p. s. i. of normal value, namely to 61 or 62 p. s. i., whereas brake pipe pressure is bottled up at 10 p. s. i. below said normal charge value, namely at 60 p. s. i. Hence, if the operator thereafter moves the brake valve handle 10 to service position to increase the degree of service application of brakes, no reduction in brake pipe pressure will take place until equalizing reservoir pressure has been reduced to a degree in excess of the degree of build-back in equalizing reservoir pressure. For example, to effect a further reduction in brake pipe pressure of 5 p. s. i., the operator must effect a reduction in equalizing reservoir pressure of 6–7 p. s. i., depending upon whether equalizing reservoir pressure had built back by 1 or 2 p. s. i.

If the locomotive brake apparatus is provided with the novel heating arrangement above described, however, such build-back in equalizing reservoir pressure will be prevented and hence the undesirable consequences of such build-back, such as described in the two preceding examples, will not occur. It will therefore be noted that the heating arrangement is also desirable and useful when applied to a brake apparatus without the brake pipe flat maintaining feature or to an apparatus having such feature temporarily cut out.

*Summary*

It will now be seen that the improved brake apparatus embodies a novel arrangement including a heating coil 38 which is effective in service position of the brake valve handle 10 to maintain the air in the equalizing reservoir 4 substantially at ambient temperature, for thereby offsetting the drop in equalizing reservoir temperature which would normally occur due to the service rate of reduction in equalizing reservoir pressure. It will also be seen that the degree of heating of the equalizing reservoir air effected by this coil under the above condition is proportionate to the length of time the brake valve handle is in service position and hence is proportionate to the degree of reduction in equalizing reservoir pressure and consequently to the degree of reduction in equalizing reservoir temperature which would normally be caused by such reduction.

It will also be seen that the novel arrangement hereinabove described may be applied to any brake apparatus of the type in which reduction in brake pipe pressure is adapted to be controlled by operator-effected reductions in equalizing reservoir pressure through the medium of an equalizing valve device; and that said novel arrangement desirably provides improved train safety whether or not such apparatus embodies a brake pipe flat maintaining feature.

Having now described the invention, what we claim as new and desire to secure by Letters Patent, is:

1. In a fluid pressure brake apparatus, the combination of a normally charged brake pipe, a normally charged equalizing reservoir, valve means responsive to a reduction in equalizing reservoir pressure to effect a corresponding reduction in brake pipe pressure, brake valve means operable to a plurality of positions and operable in at least one of said positions to effect a reduction in equalizing reservoir pressure and in another of said positions to bottle up fluid in said equalizing reservoir at reduced pressure, and means rendered effective by operation of said brake valve means to said one position and effective so long as said brake valve means is in said one position to heat the fluid in the equalizing reservoir for thereby heating such fluid to a degree sufficient to substantially offset the drop in temperature of such fluid which would normally occur during and in consequence of such reduction in pressure of fluid in said equalizing reservoir.

2. In a fluid pressure brake apparatus, the combination of a normally charged brake pipe, a normally charged equalizing reservoir, valve means responsive to a reduction in equalizing reservoir pressure to effect a corresponding reduction in brake pipe pressure, operator-controlled means operable to a plurality of positions and operable in one of said positions to effect a reduction in equalizing reservoir pressure and in another of said positions to bottle up fluid in the equalizing reservoir at reduced pressure, and means operative responsively to operation of said operator-controlled means to said one position to cause fluid in said equalizing reservoir to be heated so as to maintain such fluid at substantially the temperature of the ambient air surrounding said reservoir despite the normal drop in temperature of such fluid which would otherwise be experienced during and in consequence of such reduction in equalizing reservoir pressure.

3. In a fluid pressure brake apparatus, the combination of a normally charged brake pipe, a normally charged equalizing reservoir, valve means responsive to a reduction in equalizing reservoir pressure to effect a corresponding reduction in brake pipe pressure, brake valve means operable to a plurality of positions and operable in at least one of said positions to effect a reduction in equalizing reservoir pressure and in another of said positions to bottle up fluid in the equalizing reservoir at reduced pressure, a normally open electrical circuit closed by said brake valve means only in said one position, and means responsive to closure of said circuit to effect heating of fluid in said equalizing reservoir to a degree sufficient to maintain such fluid substantially at the temperature of the ambient air surrounding said reservoir during such reduction in equalizing reservoir pressure.

4. In a fluid pressure brake apparatus, the combination of a normally charged brake pipe, a normally charged equalizing reservoir, a brake valve device operable to a plurality of positions for controlling brakes and operable in one of said positions to effect a service rate of reduction in equalizing reservoir pressure of a selectable degree corresponding to the length of time said brake valve device is maintained in said one position and in another of said positions to bottle up fluid under pressure in the equalizing reservoir at reduced pressure, brake pipe discharge valve means operable responsively to said selectable degree of reduction in equalizing reservoir pressure to effect a corresponding degree of reduction in brake pipe pressure, maintaining valve means operable responsively to a preponderance in equalizing reservoir pressure over brake pipe pressure to supply fluid under pressure to said brake pipe for increasing brake pipe pressure substantially to equality with equalizing reservoir pressure, a normally open electrical circuit which is closed responsively to operation of said brake valve device to said one position and is maintained closed so long as said brake valve device is maintained in said one position, and heating means controlled by said circuit and operative while said circuit is closed to effect heating of the fluid in said equalizing reservoir for offsetting the drop in temperature of such fluid during, and in consequence of, and proportional to said selectable degree of reduction in equalizing reservoir pressure, such that the degree of heating of such fluid will vary automatically according to the degree of reduction in equalizing reservoir pressure for maintaining the temperature of such fluid at substantially the temperature of the ambient air surrounding said reservoir.

5. In a fluid pressure brake apparatus, the combination of a normally charged brake pipe, a normally charged equalizing reservoir, valve means controlled by opposing pressures of fluid in said brake pipe and reservoir and operative to supply fluid under pressure to and release fluid under pressure from said brake pipe so as to maintain brake pipe pressure at substantially the value of equalizing reservoir pressure, operator-controlled means operable to one position for effecting a desired degree of reduction in equalizing reservoir pressure at a restricted rate and operable to another position for bottling up fluid in said reservoir at the desired reduced pressure, and means rendered effective by operation of said operator-controlled means to said one position for nullifying the effect of the reduction in temperature of fluid in the equalizing reservoir caused while said brake valve device is in said one position and by so nullifying such effect prevent a partial build-back in equalizing reservoir pressure which would otherwise occur following operation of said brake valve device to said other position due to a rise in temperature of equalizing reservoir fluid resultant from belated absorption of heat from the ambient air through the wall of said reservoir.

6. In a fluid pressure brake apparatus, the combination of a normally charged brake pipe, a normally charged equalizing reservoir, a restricted communication, a source of fluid under pressure other than the brake pipe, brake pipe flat maintaining cut-out valve means normally positioned to effect connection of said source with said restricted communication and operable to a second position to disestablish such connection, equalizing valve means responsive to a reduction in equalizing reservoir pressure below brake pipe pressure to effect a corresponding reduction in brake pipe pressure and responsive to a preponderance in equalizing reservoir pressure over brake pipe pressure to restore brake pipe pressure to substantial equality with equalizing reservoir pressure by supply of fluid under pressure from said restricted communication to said brake pipe provided said brake pipe flat maintaining cut-out valve means is then in its normal position, operator-controlled means operable to one position for effecting a desired degree of reduction in equalizing reservoir pressure at a restricted rate and operable to another position for bottling up fluid in said reservoir at the desired reduced pressure, and means operative responsively to movement of said operator-controlled means to said one position to cause heating of the fluid in said reservoir to a degree corresponding substantially to the degree to which the temperature of such air would otherwise be reduced below the temperature of the ambient air surrounding said reservoir during and in consequence of the reduction in pressure in said reservoir effected in said one position of said operator-controlled means, the last named means being operative responsively to operation of said operator-controlled means to its said other position to discontinue such heating of fluid in said equalizing reservoir.

7. In a fluid pressure brake apparatus, the combination of a normally charged brake pipe, a normally charged equalizing reservoir, a restricted communication, a brake pipe flat maintaining cut-out valve device operable responsively to movement of a handle to a maintaining position to supply fluid at the normal charge value of brake pipe pressure to said restricted communication and operable responsively to movement of said handle to a cut-out position to terminate such supply, a brake valve device operable to a plurality of positions for controlling brakes and operable in one of said positions to effect a service rate of reduction in equalizing reservoir pressure of a selectable degree corresponding to the length of time said brake valve device is maintained in said one position and operable in another of said positions to bottle up fluid in the equalizing reservoir at reduced pressure, brake pipe discharge valve means operable responsively to said selectable degree of reduction in equalizing reservoir pressure to effect a corresponding degree of reduction in brake pipe pressure maintaining valve means operable responsively to a preponderance in equalizing reservoir pressure over brake pipe pressure to open said restricted communication to said brake pipe, a normally open electrical circuit which is closed responsively to operation of said brake valve device to said one position and is maintained closed so long as said brake valve device is maintained in said one position, and heating means controlled by said circuit and operative while said circuit is closed to effect heating of the fluid in said equalizing reservoir for offsetting the drop in temperature of such fluid during, and in consequence of, and proportional to said selectable degree of reduction in equalizing reservoir pressure.

References Cited in the file of this patent
UNITED STATES PATENTS

| | | |
|---|---|---|
| 827,515 | Eastwood | July 31, 1906 |
| 2,132,935 | Bush | Oct. 11, 1938 |